US006021802A

United States Patent [19]
Leifels et al.

[11] Patent Number: 6,021,802
[45] Date of Patent: Feb. 8, 2000

[54] DEVICE FOR CONNECTING AT LEAST A DISCHARGE TUBE AND RETURN TUBE RESPECTIVELY TO A BUNG CONNECTION OF A LIQUID CONTAINER

[75] Inventors: Joachim Leifels, Gehrden, Germany; Johannes Arnoldus Petrus Van der Heijden, Oosterhout, Netherlands

[73] Assignee: Wiva Verpakkingen B.V., Oosterhout, Netherlands

[21] Appl. No.: 09/111,037

[22] Filed: Jul. 7, 1998

[30] Foreign Application Priority Data

Jul. 8, 1997 [NL] Netherlands .......................... 1006510

[51] Int. Cl.[7] .............................................. F16K 43/00
[52] U.S. Cl. .......................... 137/320; 137/322; 137/588
[58] Field of Search .................................. 137/320, 317, 137/321, 322, 588; 251/149.4; 222/400.7, 542, 545

[56] References Cited

U.S. PATENT DOCUMENTS 3,734,332 5/1973 Grulich .................................... 215/9
4,509,663 4/1985 Fallon .............................. 222/400.7
4,699,298 10/1987 Grant et al. ....................... 222/400.7
5,669,595 9/1997 Bytheway ............................ 137/322

FOREIGN PATENT DOCUMENTS 1757412 8/1970 Germany .
9400563 11/1995 Netherlands .

*Primary Examiner*—David J. Walczak
*Attorney, Agent, or Firm*—Webb Ziesenheim Logsdon Orkin & Hanson, P.C.

[57] ABSTRACT

A device for connecting at least a discharge tube and return tube to a bung connection of a container for liquids and the like, said connection being embodied with inner screw thread, which device comprises a cylindrical insert with screw thread arranged on the cylinder outer wall and co-acting with the bung, in addition to a bottom provided with at least two openings, a tube connecting bung for placing with the lower surface on this bottom and provided with passages for the discharge tube and return tube aligned with these openings, and a clamping piece for fixing the connecting bung in the cylindrical insert via connectors wherein there are arranged lugs placed in a determined pattern and recesses receiving these lugs, wherein the clamping piece is connected non-slidably in axial direction to the bung but freely rotatable relative thereto, and wherein the connectors in the insert are arranged at a distance from the bottom in order to form a chamber, the recesses are placed above the chamber in the insert and the lugs lie on a downward extended part of the clamping piece and at a distance below the connectors, whereby the tube to be connected onto the container remains free of tension.

4 Claims, 1 Drawing Sheet

DEVICE FOR CONNECTING AT LEAST A DISCHARGE TUBE AND RETURN TUBE RESPECTIVELY TO A BUNG CONNECTION OF A LIQUID CONTAINER

BACKGROUND OF THE INVENTION

The invention relates to a device for connecting at least a discharge tube to a bung connection of a container for liquids and the like. In one prior art design, the connection is embodied with an inner screw thread, and the device comprises:

a cylindrical insert with screw thread arranged on the cylinder outer wall and co-acting with the bung, and further having a bottom provided with at least two openings, a tube connecting bung for placing with the lower surface on this bottom and provided with passages for the discharge tube aligned with these openings, and a clamping piece for fixing the connecting bung in the cylindrical insert via connecting means, wherein there are arranged lugs placed in a determined pattern and recesses receiving these lugs.

Such a device is described in the Netherlands patent application 9400563 of applicant.

Such a connecting device serves to discharge liquid out of the container, wherein it is recommended to code the bung connection such that it fits only onto a container with a predetermined liquid. Used for this purpose are lugs and recesses co-acting with these lugs which ensure that only one particular connecting device fits onto one particular insert of the container. The insert is placed by the supplier of the liquid.

The drawback to the existing device is that the different components are arranged separately of each other, which in practice may still result in errors.

SUMMARY OF THE INVENTION

The invention has for its object to obviate the above stated drawback and provides for this purpose a device which is distinguished in that the clamping piece is connected non-slidably in axial direction to the bung but freely rotatable relative thereto, wherein the connecting means in the insert are arranged at a distance from the bottom in order to form a chamber, the recesses are placed above the chamber in the insert and the lugs lie on a downward extended part of the clamping piece and at a distance below the connecting means.

Due to the rotatable connection of the clamping piece relative to the bung, wherein no axial displacement is possible, and the particular placing of the lugs and the recesses co-acting therewith, the above mentioned possible erroneous connection is prevented. The bung with bung connections can nevertheless turn freely relative to the insert.

BRIEF DESCRIPTION OF THE DRAWINGS

Above stated and other features of the invention will be further elucidated in the figure description hereinbelow of an embodiment.

DETAILED DESCRIPTION OF THE INVENTION

Figure 1:
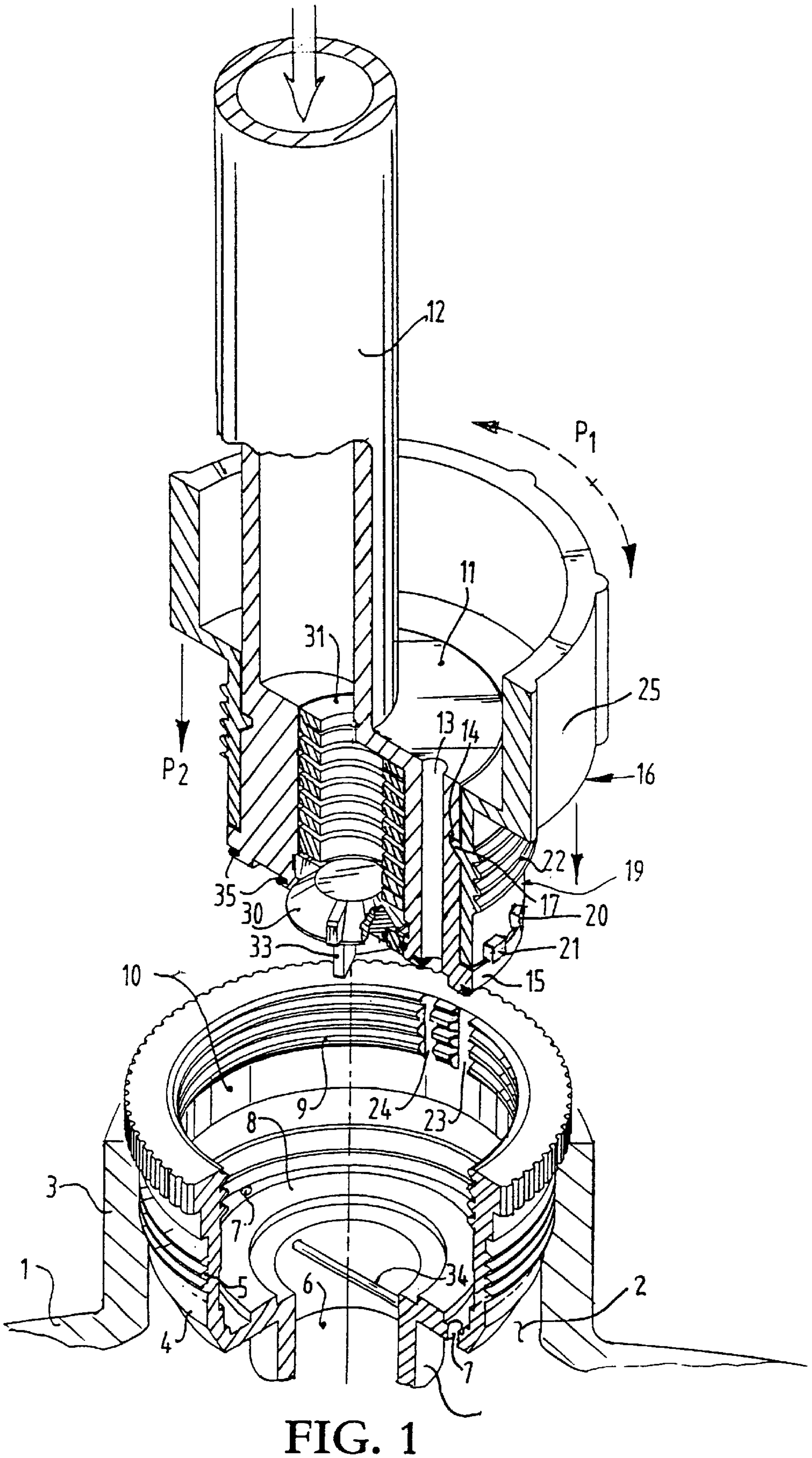
FIG. 1 shows the device of the subject invention in perspective view with partly broken away parts.

Designated with numeral 1 is the liquid container, only the upper wall of which is shown schematically. Recessed into the upper wall is an opening 2 defining bung-hole 3 having threads therein. Into this bung-hole is placed an insert 4 which is provided with a co-acting thread 5.

The insert is embodied with a passage opening 6 and a second orifice 7, the operation and function of which is further elucidated below. A screw thread 9 is arranged in the cylindrical inner part at a distance from the bottom 8 of the insert 4 such that between thread 9 and the bottom 8 a space 10 is left free which forms a chamber for a purpose further indicated below.

Into insert 4 is placed a bung 11 which is provided with a bung connection 12 for a discharge tube (not shown) and a hole 13 running through from top to bottom.

Bung 11 is embodied on the outer periphery with a channel-like recess 14.

An outward pointing flange 15 is further arranged on the bottom end.

Around bung 11 is placed a clamping piece 16 which has on the annular inner part an annular flange 17 which fits into the annular channel 14 of bung 11. The distance between annular flange 17 and the underside of cylindrical part 19 of clamping piece 16 is such that this latter ends directly above the protruding flange 15 of the bung. Passage opening 6 is formed in an integral stub 18.

Due to the connection formed by channel 14 and protruding flange 17, the clamping piece 16 is rotatable in the direction of arrow P1 relative to bung 11 but is not slidable in axial direction. Once mounted, clamping piece 16 remains fixed on bung 11.

According to the invention lug means 20,21 are arranged which are situated here on the cylindrical outer wall part of clamping piece 16 under the screw thread 22 arranged thereon.

Further arranged in the inner part of insert 4 close to screw thread 9 are two recesses 23,24, the distance between which corresponds with the distance between lug means 20,21. The width of recesses 23,24 also correspond with the relevant widths of lugs 20,21.

For placing of bung 11 into insert 4 the assembly of bung 11 and clamping piece 16 is inserted into the cylindrical opening of insert 4. For this purpose clamping piece 16 is turned in the direction of arrow P1 by means of the upward directed clamping ring 25 such that lugs 20,21 come to lie opposite recesses 23,24. The assembly can then be carried downward in the direction of arrow P2, wherein lugs 20,21 move below screw thread 9 into the space 10 in insert 4. Clamping piece 16 can therefore be rotated freely relative to bung 11 and relative to insert 4. Further rotation can take place such that screw thread 22 engages thread 9, whereafter clamping piece 16 can be screwed tightly into insert 4. Bung 11 is thus clamped fixedly in the discharge hole of liquid container 1.

Prior to definitive clamping the bung can continue to turn freely, whereby no reaction forces or twisting is generated onto the discharge tube coupled to the bung connection.

A further option is a non-return valve 30 in the passage of bung connection 12 of bung 11.

Valve 30 is pressed downward by a pressure spring 31 and closes off the opening of bung connection 12 in downward direction. During placing of the assembly of the bung 11 and clamping piece 16 into the insert, the back part 33 of valve 30 will come up against a stop 34 in the passage 6 of insert 4, wherein the valve is raised from its seat by placing of the bung 11.

It is noted that for venting purposes the opening 13 in bung 11 communicates with hole 7 via an annular chamber 34 in insert 4.

Fitting sealing rings 35 ensure a separation between the liquid passage and venting through the bung.

It is further noted that other embodiments are possible within the scope of the invention. The location of lugs 20,21 and the associated recesses 23,24 serve of course only as an example and a wholly different coding can be used with a different placing and width of lugs 20,21.

We claim:

1. A device for connecting a discharge tube to a bung hole of a container for liquids, the buns hole being embodied with an inner screw thread, which device comprises:

a) a cylindrical insert having a cylindrical outer wall with a screw thread co-acting with the bung hole, and the cylindrical insert further having a bottom provided with at least two openings;

b) a bung having a bung connection positioned within the cylindrical insert, with a lower surface of the bung connection positioned on the bottom of the cylindrical insert, and with the bung connection provided with passages therethrough aligned with the at least two openings; and c) a clamping piece for fixing the bung connection in the cylindrical insert via connecting means in the cylindrical insert and on the bung, wherein there are arranged lugs placed in a determined pattern and recesses receiving these lugs, wherein the clamping piece is connected non-slidably in an axial direction to the bung but freely rotatable relative thereto, wherein the connecting means in the cylindrical insert are arranged at a distance from the bottom of the cylindrical insert to form a chamber, the recesses are placed above the chamber in the cylindrical insert and the lugs lie on a downward extended part of the clamping piece and at a distance below the connecting means.

2. The device as claimed in claim 1, wherein the connecting means in the cylindrical insert and on the bung are formed by a screw thread.

3. The device as claimed in claim 1, wherein the bung and the clamping piece have, respectively, an annular channel or an annular inner flange.

4. The device as claimed in claim 1, wherein the bung connection is embodied with a non-return valve for at least one of the passages.

* * * * *

UNITED STATES PATENT AND TRADEMARK OFFICE

CERTIFICATE OF CORRECTION

PATENT NO. : 6,021,802

DATED : February 8, 2000

INVENTOR(S) : Joachim Leifels

It is certified that error appears in the above-indentified patent and that said Letters Patent is hereby corrected as shown below:

Column 1 Line 57 "DRAWINGS" should read --DRAWING--.

Column 3 Line 10, Claim 1, "buns hole" should read --bung hole--.

Signed and Sealed this

Tenth Day of April, 2001

*Attest:*

Nicholas P. Godici

NICHOLAS P. GODICI

*Attesting Officer*

*Acting Director of the United States Patent and Trademark Office*